(12) United States Patent
DaSilva et al.

(10) Patent No.: US 8,346,280 B2
(45) Date of Patent: Jan. 1, 2013

(54) ASSIGNMENT SCHEME FOR WIRELESS NODE IDENTIFIERS AND LOCATION CODES

(75) Inventors: Carl DaSilva, Boca Raton, FL (US); Maria G. Lam, Oakland, CA (US)

(73) Assignees: Verizon Patent and Licensing, Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 399 days.

(21) Appl. No.: 12/732,572

(22) Filed: Mar. 26, 2010

(65) Prior Publication Data

US 2011/0235574 A1 Sep. 29, 2011

(51) Int. Cl.
*H04W 24/00* (2009.01)
(52) U.S. Cl. .................. 455/456.1; 455/446; 455/432.1; 370/328
(58) Field of Classification Search ............... 455/456.1, 455/456.5, 446, 448
See application file for complete search history.

(56) References Cited

U.S. PATENT DOCUMENTS

| | | | | |
|---|---|---|---|---|
| 5,961,569 | A * | 10/1999 | Craport et al. ................ | 701/532 |
| 6,192,244 | B1 * | 2/2001 | Abbadessa .................... | 455/436 |
| 2009/0156223 | A1 * | 6/2009 | Krishnaswamy et al. .... | 455/446 |
| 2010/0029298 | A1 * | 2/2010 | Iwamura et al. ........... | 455/456.1 |
| 2010/0069119 | A1 * | 3/2010 | Mueck et al. ................ | 455/561 |

* cited by examiner

*Primary Examiner* — George Eng
*Assistant Examiner* — Joseph Dean, Jr.

(57) ABSTRACT

A method including receiving a geographic area value limit that segments a geographic region associated with a network into geographic areas; receiving a geographic area-level evolved Node B (eNB) value limit that indicates a maximum number of eNBs to reside in each geographic area; calculating eNB identifiers based on the geographic area value limit and the geographic area-level eNB value limit; assigning the eNB identifiers to eNBs associated with the network; receiving a tracking region value limit that segments the geographic region associated with the network into the geographic areas; receiving a tracking area value limit that indicates a maximum number of tracking areas within each geographic area; calculating tracking area codes based on the tracking region value limit and the tracking area value limit; and assigning the tracking area codes to the tracking areas within each geographic area.

21 Claims, 8 Drawing Sheets

200 →

| GEOGRAPHIC AREA | GEOGRAPHIC AREA VALUES | ENB IDENTIFIERS | TACS |
|---|---|---|---|
| VIRGINIA/DC/MARYLAND | 0 -11 | 0 – 11,999 | 0 – 3,071 |
| MASSACHUSETTS | 12 - 19 | 12,000 – 19,999 | 3,072 – 5,119 |
| FLORIDA | 20 - 27 | 20,000 – 27,999 | 5,120 – 7,167 |
| N. CALIFORNIA | 28 - 39 | 28,000 – 39,999 | 7,168 – 10,239 |
| S. CALIFORNIA | 40 - 55 | 40,000 – 55,999 | 10,240 – 14,335 |

| UPSTATE NEW YORK | 237 - 243 | 237,000 – 243,999 | 60,672 – 62,463 |
|---|---|---|---|
| NEW YORK METRO | 244 - 250 | 244,000 – 250,999 | 62,464 – 64,255 |

| MAINE | 253 - 255 | 253,000 – 255,999 | 64,768 – 65,535 |
|---|---|---|---|

| GEOGRAPHIC AREA | GEOGRAPHIC AREA VALUES | ENB IDENTIFIERS | TACS |
|---|---|---|---|
| VIRGINIA/DC/MARYLAND | 0 - 11 | 0 – 11,999 | 0 – 3,071 |
| MASSACHUSETTS | 12 - 19 | 12,000 – 19,999 | 3,072 – 5,119 |
| FLORIDA | 20 - 27 | 20,000 – 27,999 | 5,120 – 7,167 |
| N. CALIFORNIA | 28 - 39 | 28,000 – 39,999 | 7,168 – 10,239 |
| S. CALIFORNIA | 40 - 55 | 40,000 – 55,999 | 10,240 – 14,335 |

• • • •
• • • •
• • • •

| UPSTATE NEW YORK | 237 - 243 | 237,000 – 243,999 | 60,672 – 62,463 |
|---|---|---|---|
| NEW YORK METRO | 244 - 250 | 244,000 – 250,999 | 62,464 – 64,255 |

• • • •
• • • •
• • • •

| MAINE | 253 - 255 | 253,000 – 255,999 | 64,768 – 65,535 |

ASSIGNMENT SCHEME FOR WIRELESS NODE IDENTIFIERS AND LOCATION CODES

BACKGROUND

Various communication standards, such as Global System for Mobile Communications (GSM), Long Term Evolution (LTE), etc., require assignment of identifiers (IDs) to network devices. For example, in a GSM network, a base station identity code (BSIC) corresponding to a base station ID is assigned to each base station, and in an LTE network, an evolved Node B (eNB) ID is assigned to each eNB. According to the LTE standard, the eNB ID must be unique. In addition to IDs, various communication standards require other types of codes to be assigned. For example, in the GSM network, location area codes (LACs) are assigned, and in the LTE network tracking areas code (TACs) are assigned. According to the LTE standard, the TACs must also be unique.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "wireless node," is intended to be broadly interpreted to include a device that wirelessly communicates with a user device (e.g., user equipment (UE)). By way of example, but not limited thereto, a wireless node may correspond to an eNB or some other type of radio node. The wireless node may support one access and/or wireless technology or multiple accesses and/or wireless technologies.

According to exemplary embodiments described herein, an assignment scheme may assign wireless node IDs to wireless nodes in a network. The wireless node IDs are unique throughout the network. By way of example, but not limited thereto, the wireless node IDs may correspond to eNB IDs. Additionally, according to exemplary embodiments described herein, the assignment scheme may assign location codes. By way of example, but not limited thereto, the location codes may correspond to TACs or LACs.

By way of example, but not limited thereto, and with reference to an LTE network, the assignment scheme may assign eNB IDs according to one of the following exemplary decimal digit formats:

$$eNB\ ID = XXXXXYY \quad (1)$$

$$eNB\ ID = XXXXYYY \quad (2)$$

$$eNB\ ID = XXXYYYY \quad (3)$$

$$eNB\ ID = XXYYYYY \quad (4)$$

in which the decimal digits (e.g., 0-9) denoted by Xs may represent a geographic area value or a market area value associated with a geographic area of a network, and the decimal digits (e.g., 0-9) denoted by Ys may represent a geographic area-level eNB value that uniquely identifies an eNB within the geographic area. According to these exemplary formats, the geographic area value (or the market area value) associated with the geographic area is present in each eNB ID. As provided by the LTE standard, the range of values for the eNB ID is 0-1,048,575, which may be represented in 20 bits. Accordingly, the eNB IDs may be represented according to binary formats, etc. The eNB IDs may include leading zero(s) in the left-most X digit(s).

According to an exemplary implementation, the assignment scheme may include segmenting an entire geographic region in which the entire network occupies. According an exemplary implementation, the assignment scheme may segment the geographic region into n geographic areas in which n is considered a geographic area value limit and each geographic area is assigned a unique geographic area value between 0 and n−1. By way of example, when n=500, each geographic area of the network may be assigned a unique geographic area value between 0-499, which may be represented by the Xs described above in expressions (1)-(3). Since the format of expression (4) provides for two X digits, all of the geographic area values between 0-499 may not be represented.

Further, according to an exemplary implementation, the assignment scheme may assign a geographic area-level eNB value limit v to each geographic area. The geographic area-level eNB value limit indicates a maximum number of eNBs to reside in a segmented geographic area and each eNB within the geographic area is assigned a unique eNB value between 0 and v−1. According to an exemplary implementation, the geographic area-level eNB value limit may be the same for each segmented geographic area. In other exemplary implementations, the geographic area-level eNB value limit may not be the same for each segmented geographic area. By way of example, when v=100, each eNB within the segmented geographic area may be assigned a unique geographic-area level eNB value between 0-99, which may be represented by the Ys described above in expressions (1)-(3).

Depending on the geographic area value limit n and the geographic area-level eNB value limit v, one or more of the expressions (1)-(4) may be utilized. Additionally, as a further consequence of the values n and v, when more digits are assigned to the geographic area value limit than the geographic area-level eNB value limit, the LTE network may be divided into more geographic areas with each geographic area having fewer eNBs. Conversely, when fewer digits are assigned to the geographic area value limit than the geographic-area level eNB value limit, the LTE network may be divided into fewer geographic areas with each geographic area having a greater number of eNBs.

Based on the geographic area value and the geographic area-level eNB value, the assignment scheme may calculate an eNB ID that is unique within a network according to one of the following exemplary expressions:

$$eNB\ ID = \text{geographic area value} * 100 + \text{geographic area-level } eNB \text{ value} \quad (5)$$

$$eNB\ ID = \text{geographic area value} * 1000 + \text{geographic area-level } eNB \text{ value} \quad (6)$$

$$eNB\ ID = \text{geographic area value} * 10000 + \text{geographic area-level } eNB \text{ value} \quad (7)$$

$$eNB\ ID = \text{geographic area value} * 100000 + \text{geographic area-level } eNB \text{ value} \quad (8)$$

in which expression (5) may correspond to the format of expression (1), expression (6) may correspond to the format of expression (2), expression (7) may correspond to the format of expression (3), and expression (8) may correspond to expression (4). According to an exemplary implementation, the assignment scheme may permit the re-use of the geographic area-level eNB values (e.g., 0-99) for multiple geographic areas, while simultaneously ensuring a unique eNB ID.

Figure 1A:
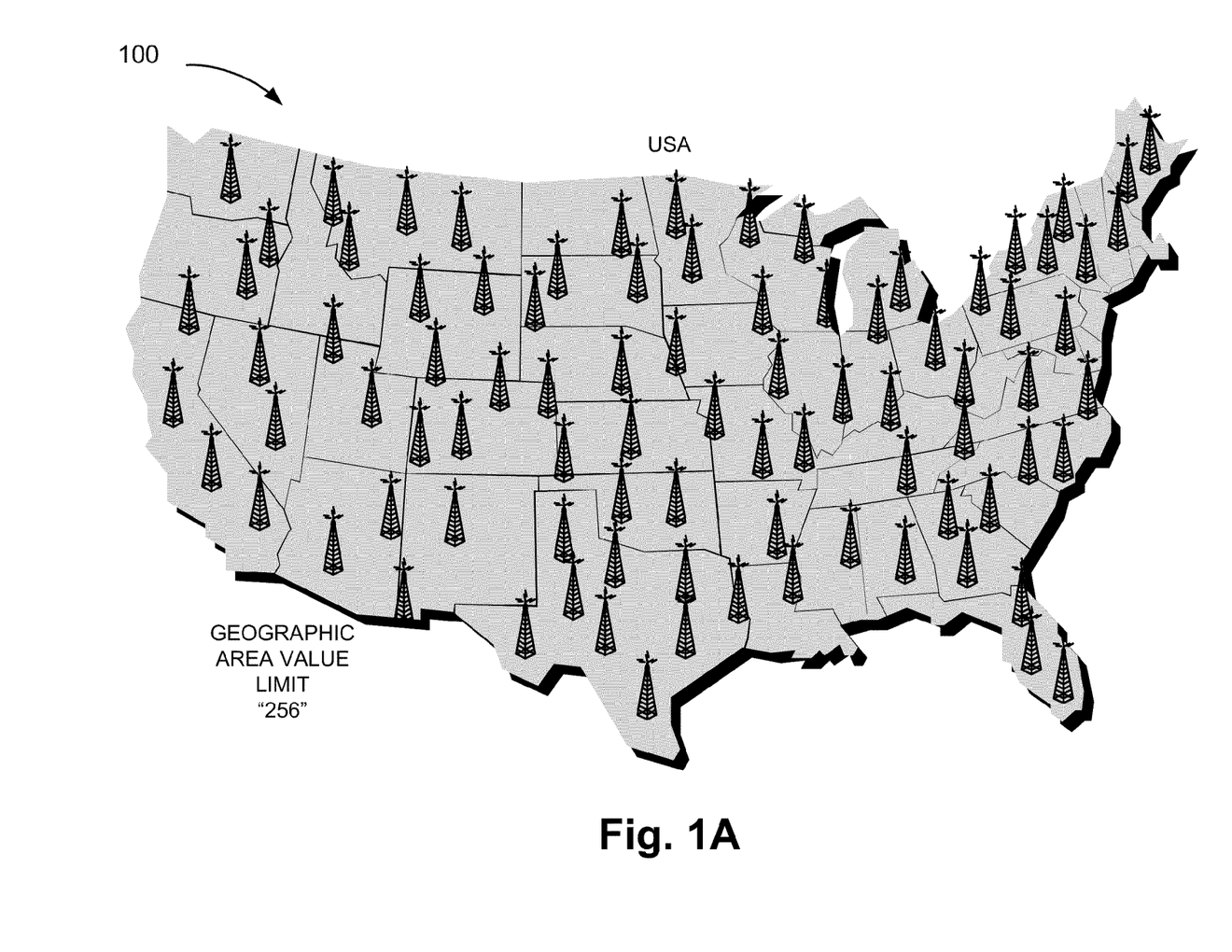
FIG. 1A is a diagram illustrating an exemplary assignment of a geographic area value limit of a geographic region associated with an exemplary network to which an exemplary assignment scheme may be applied.

FIG. 1A is a diagram illustrating an exemplary assignment of a geographic area value limit of a geographic region associated with an exemplary network to which an exemplary assignment scheme may be applied. By way of example, as illustrated in FIG. 1A, an LTE network 100 may span across the United States of America (USA). For purposes of discussion, it may be assumed that the USA may be segmented into (e.g., n=256) geographic areas, in which each geographic area may be assigned a unique geographic area value between 0 and 255. According to an exemplary implementation, a geographic area may not span between two time zones. According to another exemplary implementation a geographic area may span between two time zones.

Figure 1B:
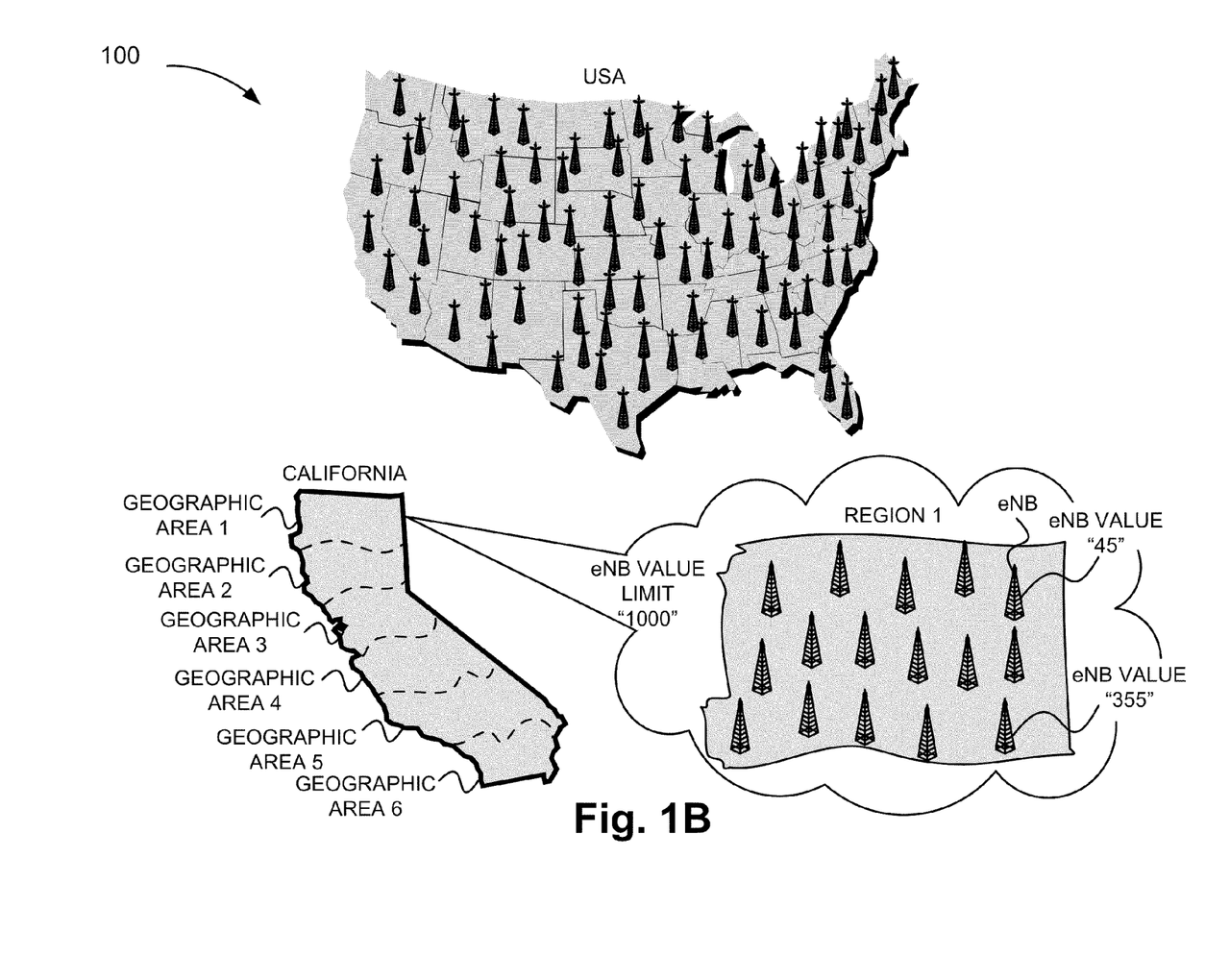
FIG. 1B is a diagram illustrating an exemplary segmentation of a portion of the geographic region and an exemplary assignment of a geographic area-level eNB value limit within that portion of the geographic region according to the assignment scheme.

FIG. 1B is a diagram illustrating an exemplary segmentation of a portion of the geographic region and an exemplary assignment of a geographic area-level eNB value limit within that portion of the geographic region according to an exemplary implementation of the assignment scheme. By way of example, as illustrated in FIG. 1B, assume the state of California is segmented into unique geographic areas values 1-6 in which geographic area 1 may be assigned a geographic area-level eNB value limit of 1000. As such, each eNB in geographic area 1 may be assigned a unique geographic-area level eNB value between 0-999.

Based on the above example, and with reference to expressions (2) and (6), eNBs in geographic area 1 may be assigned unique eNB IDs between 0001000-0001999. According to an exemplary embodiment of the assignment scheme, the geographic area value has a continuous presence in each instance of the unique eNB IDs. In this example, expressions (3) and (7), and expressions (4) and (8) may not be utilized because eNB IDs would have values greater than 1,048,575.

Under the LTE standard, the cell ID (CI) is a 28 bit number that uniquely identifies the cell in network 100. The first 20 bits of the cell ID are to correspond to the eNB ID and the lower 8 bits are to identify the cell associated with the eNB, assuming that the eNB is a Macro eNB. If the eNB is a Home eNB, then the Home eNB ID is represented by the entire 28 bits and exactly matches the cell ID. In the case of the Home eNB, up to 20 bits of the 28 bits may be assigned according to the wireless node ID assignment scheme described herein. The cell ID is broadcast in a system information block type 1 message.

As previously described, the assignment scheme may assign location codes. According to an exemplary implementation, the assignment scheme may include segmenting an entire geographic region which the entire network occupies. The assignment scheme may segment the geographic region into m geographic areas in which m is considered a geographic area value limit and each geographic area is assigned a unique geographic area value between 0 and m−1.

By way of example, but not limited thereto, and with reference to the LTE standard, the location codes may correspond to TACs. Each TAC is to be unique within the LTE network. Similar to the LAC of the GSM network, the LTE standard requires the TAC to be represented by two bytes. According to an exemplary implementation, LTE network 100 may be segmented into m tracking regions in which each tracking region may be assigned a unique tracking region value between 0 and m−1. According to an exemplary implementation, a high byte value of the TAC may represent the tracking region value.

Further, according to an exemplary implementation, the assignment scheme may assign a tracking area value limit w to each tracking region. The tracking area value limit indicates a maximum number of tracking areas within the tracking region. According to an exemplary implementation, the tracking area value limit may be the same for each tracking region. By way of example, when w=256, the tracking region may be further segmented into 256 tracking areas in which each tracking area may be assigned a unique tracking area (TA) value between 0-255 (e.g., 0-(w−1)). According to an exemplary implementation, a low byte of the TAC may represent a tracking area within the tracking region.

By way of example, but not limited thereto, the assignment scheme may assign TACs according to the following exemplary expression:

$$TAC = \text{tracking region value} * 256 + TA \text{ value} \quad (9),$$

in which the multiplication of 256 shifts a value of the tracking region to the left by one byte and the TA value is represented in the lower byte. According to the exemplary implementation of the assignment scheme, each TAC is unique within LTE network 100.

Figure 1C:
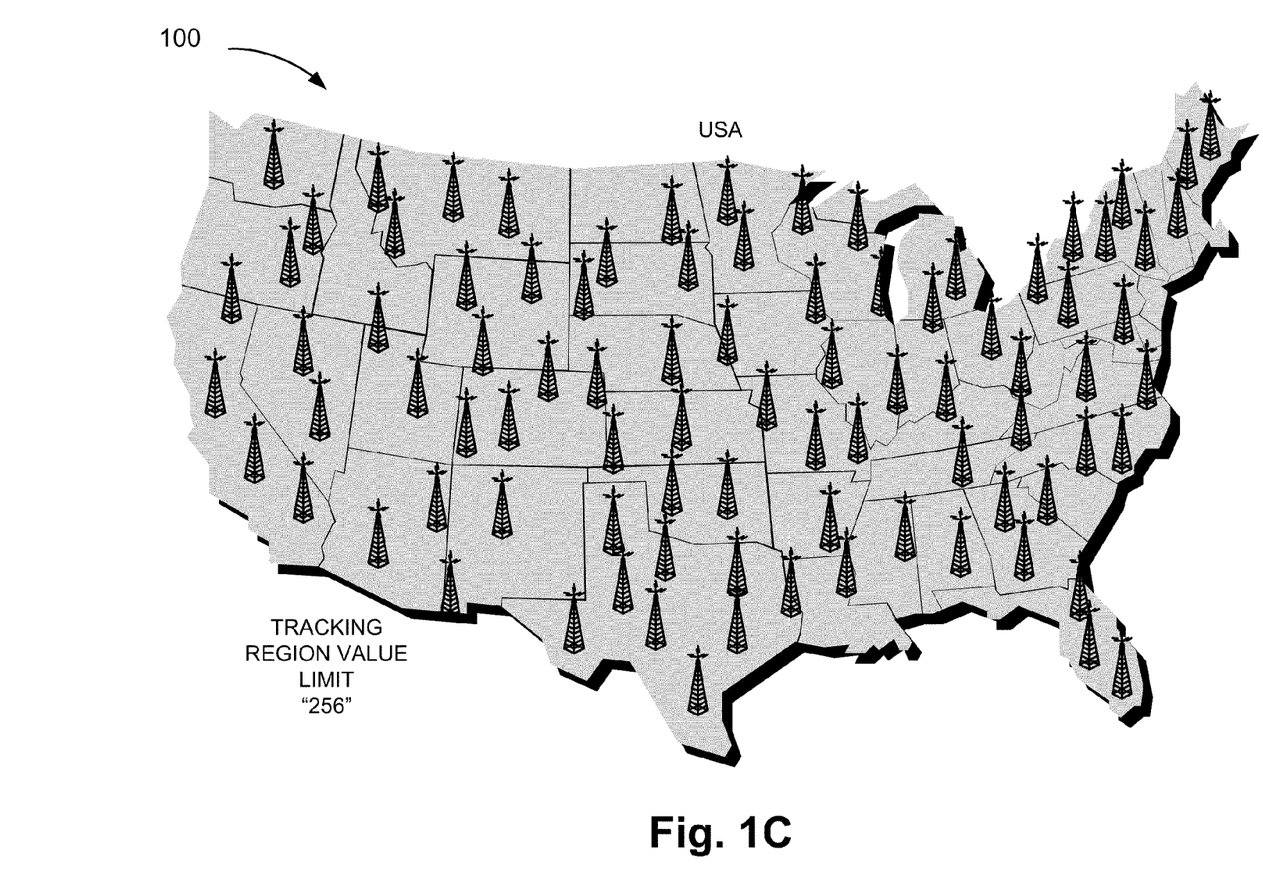
FIG. 1C is a diagram illustrating an exemplary assignment of a tracking region value limit associated with an exemplary network according to the assignment scheme.

FIG. 1C is a diagram illustrating an exemplary assignment of tracking regions associated with an exemplary network according to an exemplary implementation of the assignment scheme. By way of example, as illustrated in FIG. 1C, LTE network 100 may be segmented into m=256 tracking regions. As further illustrated in FIG. 1D, a tracking region 1 may be further segmented into w=256 tracking areas (TAs). In an exemplary implementation, the value of w may be the same for each tracking region. In other implementations, the value of w may be different for one or more tracking regions.

Figure 1D:
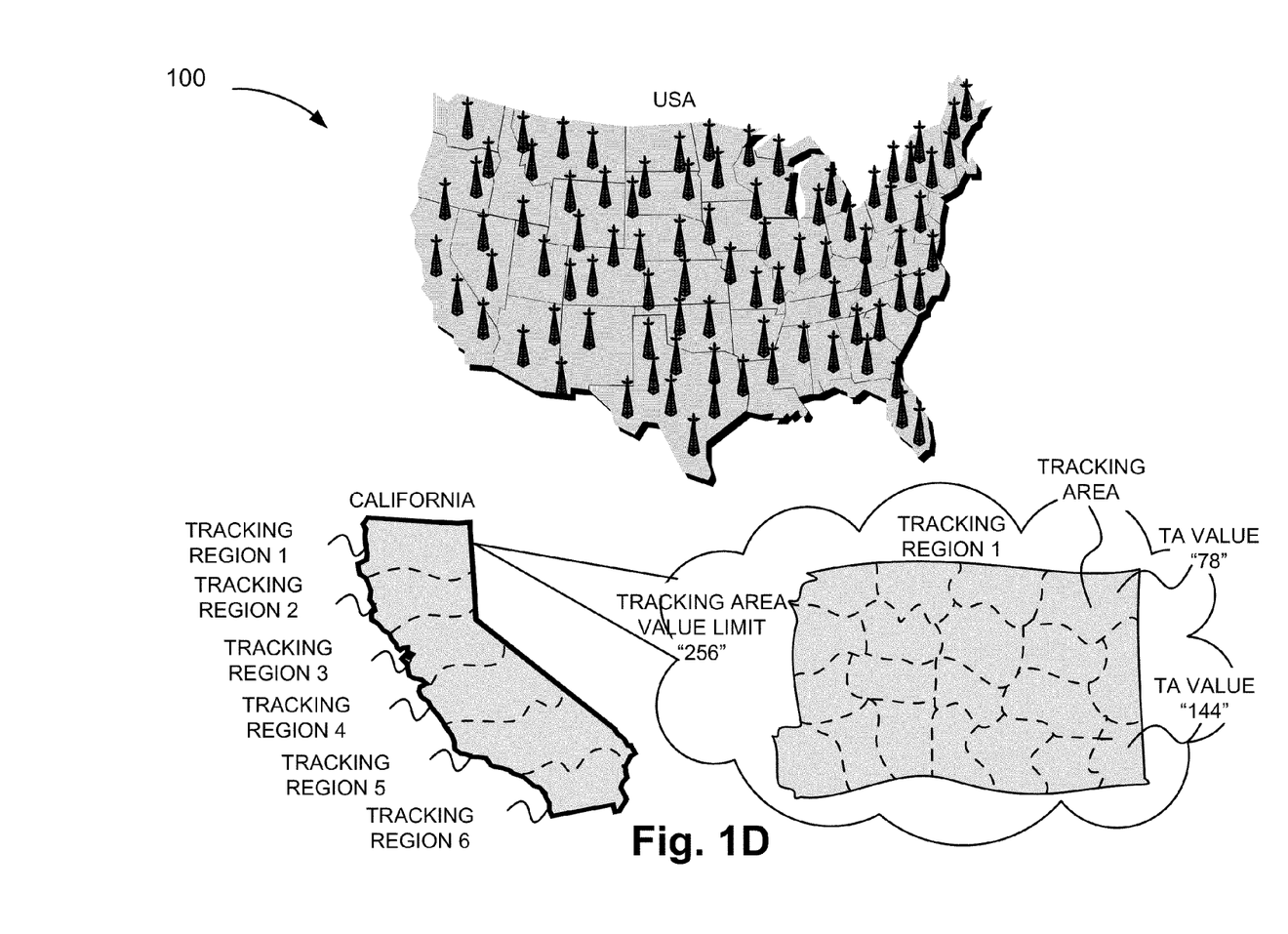
FIG. 1D is a diagram illustrating an exemplary segmentation of a portion of the geographic region and an exemplary assignment of a tracking area value limit within that portion of the geographic region according to the assignment scheme.

Based on the above example, and with reference to expression (9), tracking region 1 may be assigned unique TACs between 256 and 511. According to the exemplary embodiment of the assignment scheme, each of the m tracking region values has a continuous presence (e.g., in the high byte of the TAC) in each instance of the TACs.

According to an exemplary implementation of the assignment scheme, all eNBs residing within a given tracking region may be assigned a common TAC high byte value. Additionally, according to such an implementation, the eNBs sharing the common TAC high byte value may share a common serving gateway (SGW). By way of example, but not limited thereto, when a mobility management entity (MME)

communicates with a DNS server to determine which SGW to assign to a UE, knowledge of the high byte value of a TAC assigned to the tracking region in which the UE resides may be sufficient in determining which SGW to assign to the UE. In this way, the DNS server may be provisioned with high bytes of TACs-to-SGWs mappings versus two-byte TACs-to-SGWs mappings. According to such an implementation, domain name system (DNS) server provisioning may be simplified.

As described, the assignment scheme may include segmenting a geographic region corresponding to LTE network 100 to calculate eNB IDs and TACs. For example, the geographic region may be segmented into n geographic areas to calculate eNB IDs and the geographic region may be segmented into m geographic areas (or tracking regions) to calculate TACs. According to an exemplary embodiment, the n geographic areas may match the m geographic areas. In other words, the value and the geographic area represented by the Xs in the eNB ID may match the value and the geographic area of the TAC high byte. Since the TAC high byte is limited to representing values between 0-255, the value of n is limited to values between 0-255. Depending on the values of n and m, an appropriate expression from expressions (1)-(4) may be selected keeping in mind that the range of values for the eNB ID is 0-1,048,575. According to this particular exemplary embodiment, all eNBs within a particular geographic area may be assigned unique eNB IDs in which the geographic area value is the same, in addition to the eNBs being assigned unique TACs in which the TAC high byte value is the same.

Figure 2:
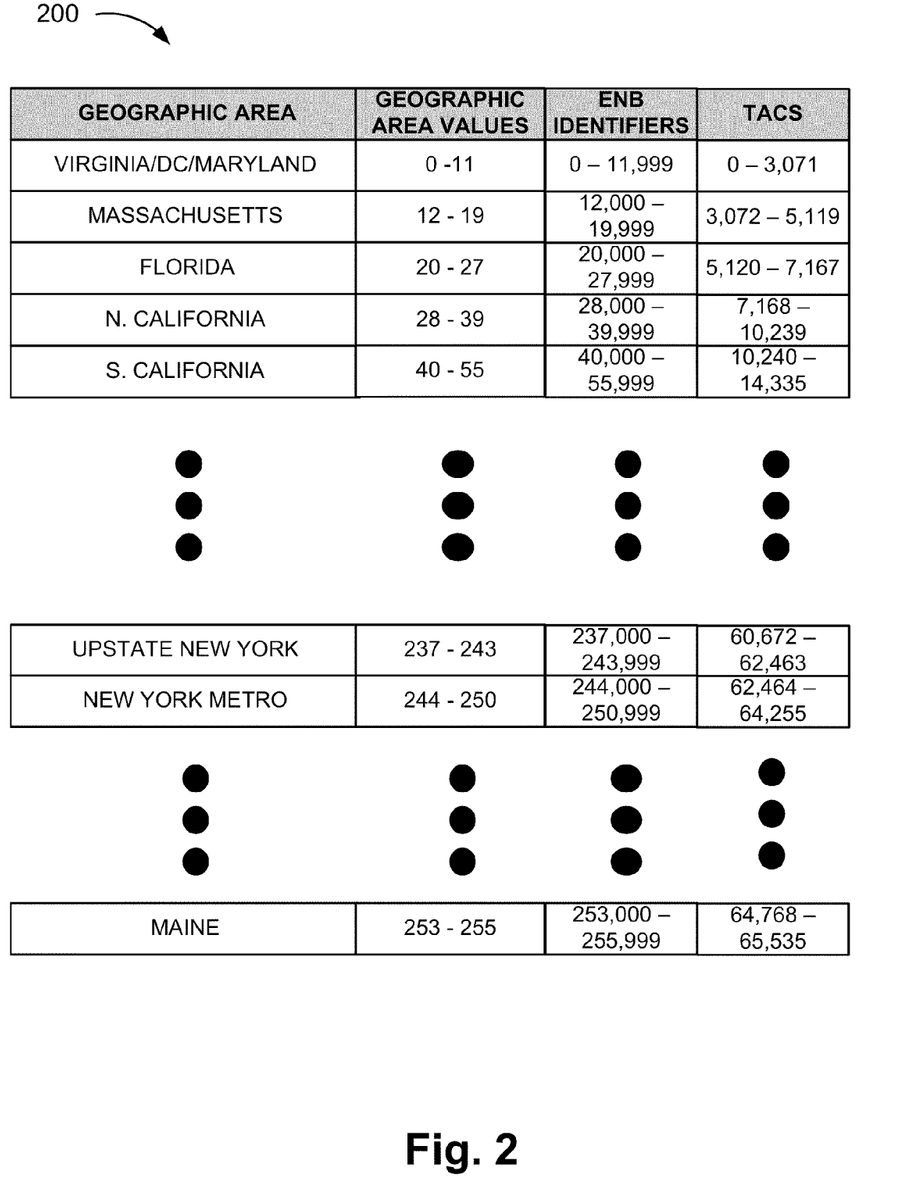
FIG. 2 is a diagram illustrating an exemplary table indicating exemplary wireless node ID values and location code values according to the assignment scheme.

FIG. 2 is a diagram illustrating an exemplary table 200 indicating exemplary wireless node ID values and location code values according to an exemplary implementation of the assignment scheme. By way of example, table 200 includes, among other things, exemplary values that may be assigned as eNB IDs and TACs. For example, the USA may be segmented into 256 geographic areas (i.e., n=m=256), as illustrated in the geographic area values column of table 200, such that the borders of the geographic areas associated with the segmentation match. Additionally, the values represented by the Xs with respect to the eNB IDs match the values represented by the TAC high byte. For example, the geographic area values 0-11 may be represented by the Xs in the eNB IDs ranging from 0-11,999, and the values 0-11 may be represented by the TAC high byte included in the TACs ranging from 0-3,071. In this example, the geographic area-level eNB value limit is 1000 (i.e., having a range of geographic area-level eNB values between 0-999) and the maximum number of TAs within each tracking region is limited to a tracking area value limit of 256 (having a range of tracking area values between 0-255). In this example, each tracking region may be assigned the same tracking area value limit.

Figure 3:
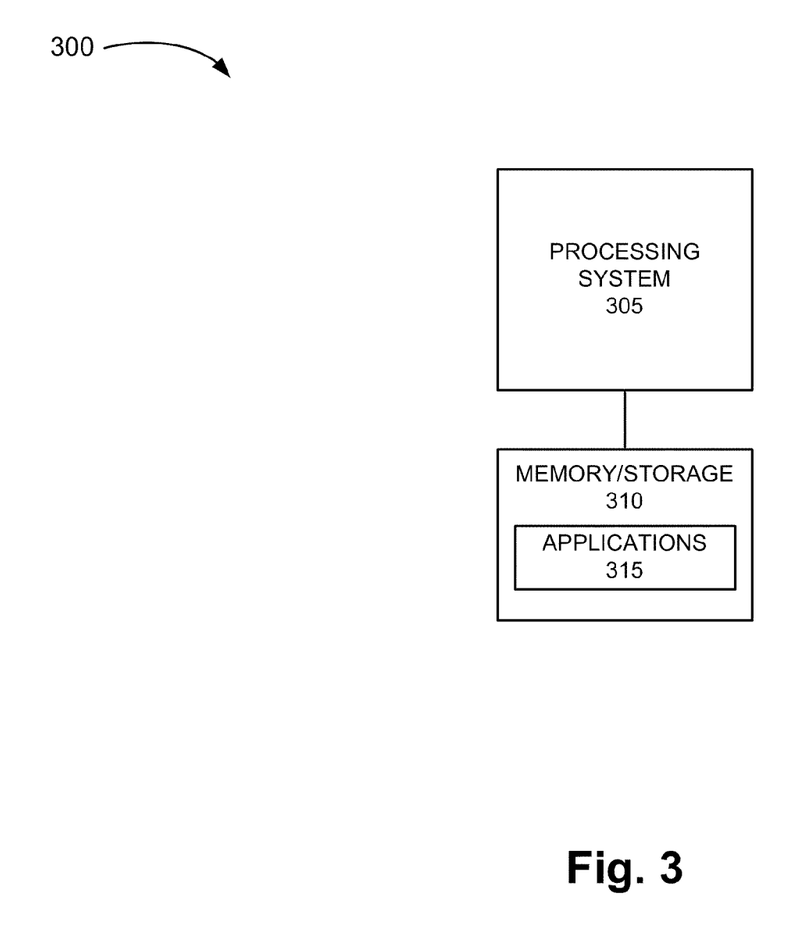
FIG. 3 is a diagram illustrating exemplary components of a device in which an exemplary embodiment of the assignment scheme may be implemented.

FIG. 3 is a diagram illustrating exemplary components of a device 300 in which an exemplary embodiment of an exemplary assignment scheme may be implemented. Device 300 may correspond to a variety of computational devices. By way of example, but not limited thereto, device 300 may correspond to a computer (e.g., a desktop computer, a laptop computer, a handheld computer), a personal digital assistant (PDA), a wireless phone, or some other type of portable device, mobile device, handheld device, stationary device, and/or user device.

As illustrated, device 300 may include a processing system 305 and memory/storage 310 including applications 315. In other implementations, device 300 may include fewer components, additional components, different components, and/ or a different arrangement of components than those illustrated in FIG. 3 and described herein.

Processing system 305 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 305 may control the overall operation, or a portion thereof, of device 300, based on, for example, an operating system and/or various applications (e.g., applications 315).

Memory/storage 310 may include one or more memories and/or one or more secondary storages. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. Memory/storage 310 may include a memory, a storage device, or storage component that is external to and/or removable from device 300, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 310 may store data, application(s), and/or instructions related to the operation of device 300.

Applications 315 may include software that provides various services or functions. According to an exemplary embodiment, applications 315 may include an application that implements exemplary embodiments of the assignment scheme described herein.

As described herein, device 300 may perform operations in response to processing system 305 executing software instructions contained in a computer-readable medium, such as memory/storage 310. The software instructions may be read into memory/storage 310 from another computer-readable medium or from another device (e.g., via communication interface, not illustrated). The software instructions contained in memory/storage 310 may cause processing system 305 to perform processes described herein. Alternatively, hardwired circuitry may be used in place of or in combination with software instructions to implement processes described herein. Thus, implementations described herein are not limited to any specific combination of hardware circuitry and software.

Figure 4:
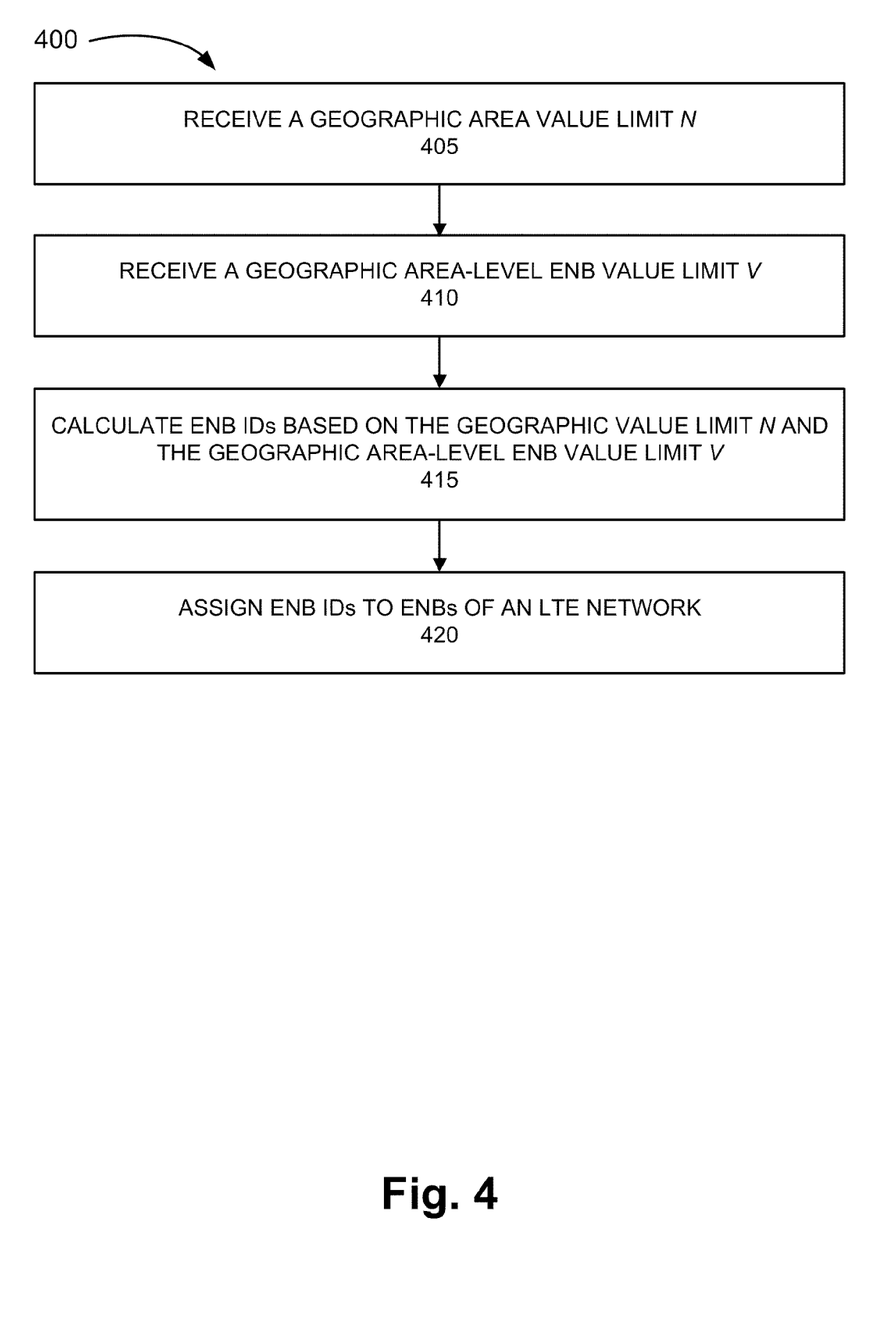
FIG. 4 is a flow diagram illustrating exemplary process for assigning wireless node IDs.

FIG. 4 is a flow diagram illustrating exemplary processes 400 for assigning wireless node IDs. In an exemplary implementation, process 400 may be performed by device 300.

For purposes of discussion, process 400 will be described in a manner in which wireless node IDs correspond to eNB IDs. In other implementations, wireless node IDs may correspond to a different type of wireless node ID.

Process 400 may include receiving a geographic area value limit n (block 405). By way of example, but not limited thereto, device 300 may receive a geographic area value limit n. In an exemplary implementation, a network administrator may select the geographic area value limit n and provide this parameter to device 300. The geographic area value limit n may or may not correspond to an actual number of segments of a geographic region of an LTE network. By way of example, the geographic area value limit n may be a number that provides a greater range of geographic area values than the actual number of segments of the geographic region (e.g., to allow for expansion). Alternatively, the geographic area value limit n may provide a range of geographic area values that match the number of actual segments of the geographic region.

A geographic area-level eNB value limit v may be received (block 410). By way of example, but not limited thereto, device 300 may receive a geographic area-level eNB value limit v. In an exemplary implementation, a network administrator may select the geographic area-level eNB value limit v and provide this parameter to device 300. According to an exemplary implementation, the geographic area-level eNB value limit v may be the same for each geographic area. According to another exemplary implementation, the geographic area-level eNB value limit v may be different for one or more geographic areas. The geographic area-level eNB value limit v may or may not correspond to an actual number of eNBs residing in a geographic area. By way of example, the geographic area-level eNB value limit v may be a number that provides a greater range of eNB values than the actual number of eNBs (e.g., to allow for expansion) or may provide a range of eNB values that match the number of eNBs in a geographic area.

ENB IDs may be calculated based on geographic area value limit n and geographic area-level eNB value limit v (block 415). As previously described, eNB IDs may be calculated according to one of the following exemplary expressions:

$$eNB\ ID = \text{geographic area value} * 100 + \text{geographic area-level } eNB \text{ value} \quad (5)$$

$$eNB\ ID = \text{geographic area value} * 1000 + \text{geographic area-level } eNB \text{ value} \quad (6)$$

$$eNB\ ID = \text{geographic area value} * 10000 + \text{geographic area-level } eNB \text{ value} \quad (7)$$

$$eNB\ ID = \text{geographic area value} * 100000 + \text{geographic area-level } eNB \text{ value} \quad (8).$$

In an exemplary implementation, device 300 may generate geographic area values based on geographic area value limit n. By way of example, when n=256, the geographic area values may have a range between 0-255. Additionally, in an exemplary implementation, device 300 may generate geographic area-level eNB values based on geographic area-level eNB value limit v. By way of example, when v=1000, geographic area-level eNB values may have a range between 0-999. Device 300 may apply the generated geographic area values and the generated area-level eNB values to an appropriate expression. In an exemplary implementation, the network administrator may select the appropriate expression. In another exemplary implementation, device 300 may select the appropriate expression based on the range of values generated. Device 300 may store and/or output the eNB IDs resulting from block 415.

ENB IDs may be assigned to eNBs (block 420). For example, the network administrator may assign the eNB IDs calculated in block 415 to the eNBs associated with an LTE network.

Although FIG. 4 illustrates an exemplary process 400 for assigning wireless node IDs, in other implementations, process 400 may include additional operations, fewer operations, and/or different operations than those illustrated in FIG. 4 and described.

Figure 5:
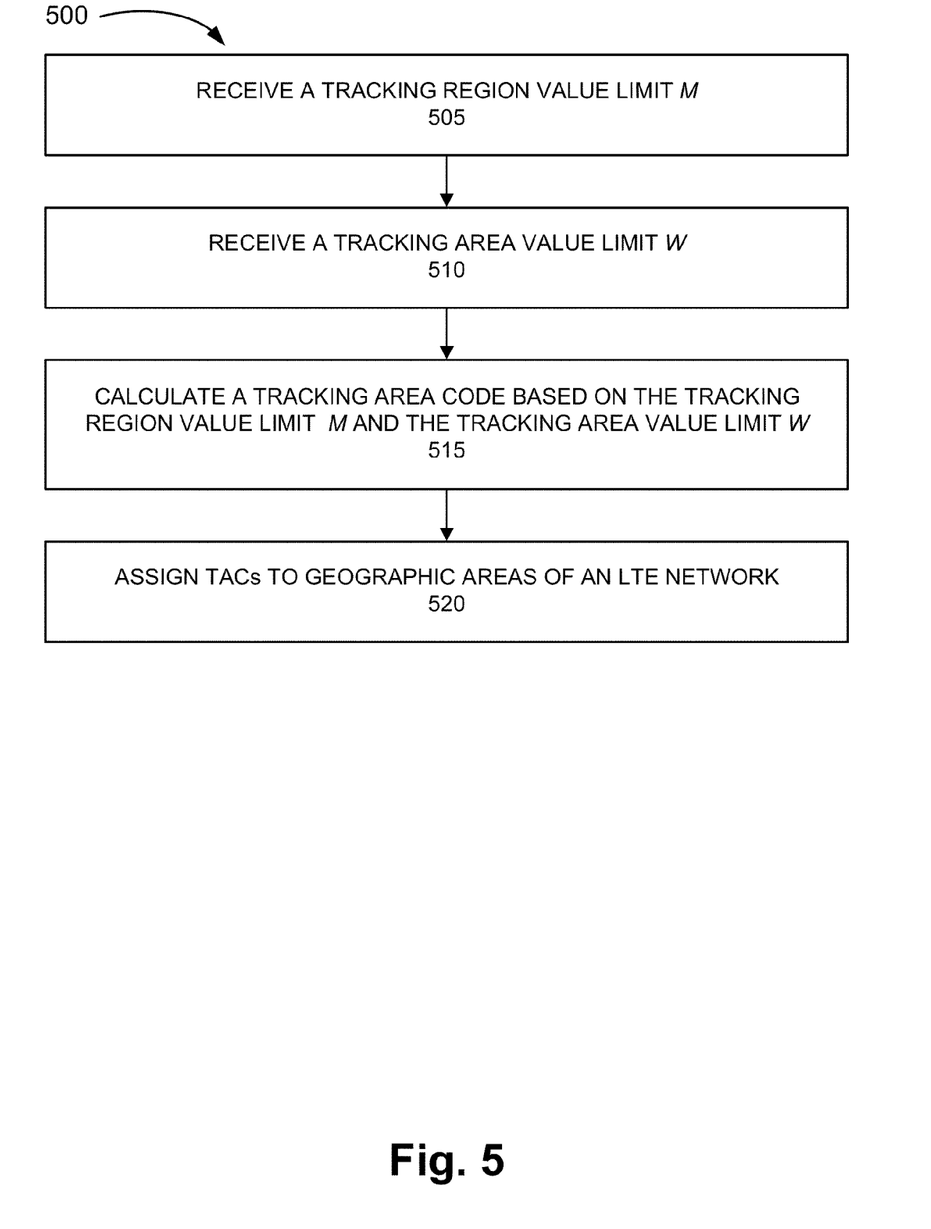
FIG. 5 is a flow diagram illustrating exemplary process for assigning location codes.

FIG. 5 is a flow diagram illustrating exemplary processes 500 for assigning location codes. In an exemplary implementation, process 500 may be performed by device 300.

For purposes of discussion, process 500 will be described in a manner in which locations codes correspond to TACs. In other implementations, location codes may correspond to a different type of location code.

Process 500 may include receiving a tracking region value limit m (block 505). By way of example, but not limited thereto, device 300 may receive a tracking region value limit m. In an exemplary implementation, a network administrator may select the tracking region value limit m and provide this parameter to device 300. The tracking region value limit m may or may not correspond to an actual number of segments of a geographic region of an LTE network. By way of example, the tracking region value limit m may be a number that provides a greater range of tracking region values than the actual number of segments of the geographic region (e.g., to allow for expansion). Alternatively, the tracking region value limit m may provide a range of tracking region values that match the number of actual segments of the geographic region.

A tracking area value limit w may be received (block 510). By way of example, but not limited thereto, device 300 may receive a tracking area value limit w. In an exemplary implementation, a network administrator may select the tracking area value limit w and provide this parameter to device 300. According to an exemplary implementation, the tracking area value limit w may be the same for each tracking region. According to another exemplary implementation, the tracking area value limit w may be different for one or more tracking regions. The tracking area value limit w may or may not correspond to an actual number of segments of the tracking region. By way of example, the number of eNBs within a tracking region may change over time. In this regard, the tracking area value limit w may provide a greater range of tracking area values than the actual number of tracking area values needed. Alternatively, the tracking area value limit w may provide a range of tracking area values that is appropriate given the number of eNBs in the tracking region, the placement of the eNBs within the tracking region, etc.

TACs may be calculated based on tracking region value limit m and tracking area value limit w (block 515). As previously described, TACs may be calculated according to the following exemplary expression:

$$TAC = \text{tracking region value} * 256 + TA\ value \quad (9).$$

In an exemplary implementation, device 300 may generate tracking region values based on tracking region value limit m. By way of example, when m=256, the tracking region values may have a range between 0-255. Additionally, in an exemplary implementation, device 300 may generate TA values based on tracking area value limit w. By way of example, when w=200, TA values may have a range between 0-199. Device 300 may apply the generated tracking region values and the generated TA values to expression (9). Device 300 may store and/or output the TACs resulting from block 515.

TACs may be assigned to geographic areas (block 520). For example, the network administrator may assign the TACs calculated in block 415 to geographic areas associated with an LTE network.

Although FIG. 5 illustrates an exemplary process 500 for assigning TACs, in other implementations, process 500 may include additional operations, fewer operations, and/or different operations than those illustrated in FIG. 5 and described.

As previously described, according to an exemplary implementation of the assignment scheme, the n geographic areas may match the m geographic areas. In such an implementation, all eNBs within a particular geographic area may be assigned unique eNB IDs in which the geographic area value, which may be represented by the Xs according to the exemplary eNB ID formats, is the same, in addition to the eNBs being assigned unique TACs in which the TAC high byte value is the same.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the processes illustrated in FIGS. 4 and 5, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
    receiving a geographic area value limit that segments a geographic region associated with a network into geographic areas;
    receiving a geographic area-level evolved Node B (eNB) value limit that indicates a maximum number of eNBs to reside in each geographic area;
    calculating eNB identifiers based on the geographic area value limit and the geographic area-level eNB value limit;
    assigning the eNB identifiers to eNBs associated with the network;
    receiving a tracking region value limit that segments the geographic region associated with the network into the geographic areas;
    receiving a tracking area value limit that indicates a maximum number of tracking areas within each geographic area;
    calculating tracking area codes based on the tracking region value limit and the tracking area value limit; and
    assigning the tracking area codes to the tracking areas within each geographic area associated with the network, wherein the tracking region value limit is equal to the geographic area value limit and borders of the geographic areas match with respect to segmentation based on the geographic area value limit and segmentation based on the tracking region value limit.

2. The method of claim 1, further comprising:
    generating geographic area values based on the geographic area value limit; and
    generating geographic area-level eNB values based on the geographic area-level eNB value limit.

3. The method of claim 2, wherein the eNB identifiers are calculated according to one of the following expressions:

$eNB$ identifier=geographic area value*100+geographic area-level $eNB$ value;

$eNB$ identifier=geographic area value*1000+geographic area-level $eNB$ value;

$eNB$ identifier=geographic area value*10000+geographic area-level $eNB$ value; or $eNB$ identifier=geographic area value*100000+geographic area-level $eNB$ value.

4. The method of claim 3, further comprising:
    generating tracking region values based on the tracking region value limit; and
    generating tracking area values based on the tracking area value limit.

5. The method of claim 4, wherein the tracking region values each has a unique value between 0 and (tracking region value limit−1) and the tracking area values each has a unique value between 0 and (tracking area value limit−1).

6. The method of claim 4, wherein the tracking area codes are calculated according to the following expression:
    tracking area code=tracking region value+tracking area value, wherein the tracking area code is represented as a 16 bit value and the tracking region value is represented by a high byte and the tracking area value is represented by a low byte.

7. The method of claim 6, wherein eNBs within respective geographic areas share a common high byte value associated with respective tracking area codes and a common geographic area value associated with respective eNB identifiers.

8. The method of claim 1, wherein each geographic area does not span between two time zones.

9. A device comprising:
    one or more memories to store instructions; and
    one or more processors to execute the instructions in the one or more memories to:
        receive a geographic area value limit that segments a geographic region associated with a network into geographic areas;
        receive a geographic area-level evolved Node B (eNB) value limit that indicates a maximum number of eNBs to reside in each geographic area;
        calculate eNB identifiers based on the geographic area value limit and the geographic area-level eNB value limit;
        store or output the eNB identifiers;
        receive a tracking region value limit that segments the geographic region associated with the network into the geographic areas;

receive a tracking area value limit that indicates a maximum number of tracking areas within each geographic area;
calculate tracking area codes based on the tracking region value limit and the tracking area value limit; and
store or output the tracking area codes, wherein the tracking region value limit is equal to the geographic area value limit and borders of the geographic areas match with respect to segmentation based on the geographic area value limit and segmentation based on the tracking region value limit.

10. The device of claim 9, wherein the one or more processors are to execute instructions to:
generate geographic area values based on the geographic area value limit; and
generate geographic area-level eNB values based on the geographic area-level eNB value limit.

11. The device of claim 10, wherein the geographic area values are unique values between 0 and (geographic area value limit−1).

12. The device of claim 10, wherein the one or more processors are to execute instructions to calculate the eNB identifiers according to one of the following expressions:

$$eNB\text{ identifier}=\text{geographic area value}*100+\text{geographic area-level }eNB\text{ value;}$$

$$eNB\text{ identifier}=\text{geographic area value}*1000+\text{geographic area-level }eNB\text{ value;}$$

$$eNB\text{ identifier}=\text{geographic area value}*10000+\text{geographic area-level }eNB\text{ value; or}$$

$$eNB\text{ identifier}=\text{geographic area value}*100000+\text{geographic area-level }eNB\text{ value.}$$

13. The device of claim 9, wherein the one or more processors are to execute instructions to:
generate tracking region values based on the tracking region value limit; and
generate tracking area values based on the tracking area value limit.

14. The device of claim 13, wherein the one or more processors are to execute instructions to calculate the tracking area codes according to the following expression:
tracking area code=tracking region value+tracking area value, wherein the tracking area code is represented as a 16 bit value and the tracking region value is represented by a high byte and the tracking area value is represented by a low byte.

15. The device of claim 9, wherein eNBs within respective geographic areas share a common high byte value associated with respective tracking area codes and a common geographic area value associated with respective eNB identifiers.

16. The device of claim 9, wherein the tracking region value limit is below 256.

17. A non-transitory computer-readable medium containing instructions executable by at least one processor, the non-transitory computer-readable medium storing instructions to:
receive a geographic area value limit that segments a geographic region associated with a network into geographic areas;
receive a geographic area-level evolved Node B (eNB) value limit that indicates a maximum number of eNBs to reside in each geographic area;
calculate eNB identifiers based on the geographic area value limit and the geographic area-level eNB value limit;
store or output the eNB identifiers;
receive a tracking region value limit that segments the geographic region associated with the network into the geographic areas;
receive a tracking area value limit that indicates a maximum number of tracking areas within each geographic area;
calculate tracking area codes based on the tracking region value limit and the tracking area value limit; and
store or output the tracking area codes, wherein the tracking region value limit is equal to the geographic area value limit and borders of the geographic areas match with respect to segmentation based on the geographic area value limit and segmentation based on the tracking region value limit.

18. The non-transitory computer-readable medium of claim 17, further comprising one or more instructions to:
generate geographic area values based on the geographic area value limit; and
generate geographic area-level eNB values based on the geographic area-level eNB value limit.

19. The non-transitory computer-readable medium of claim 18, wherein the instructions to calculate the eNB identifiers further comprise one or more instructions to calculate the eNB identifiers based on one of the following expressions:

$$eNB\text{ identifier}=\text{geographic area value}*100+\text{geographic area-level }eNB\text{ value;}$$

$$eNB\text{ identifier}=\text{geographic area value}*1000+\text{geographic area-level }eNB\text{ value;}$$

$$eNB\text{ identifier}=\text{geographic area value}*10000+\text{geographic area-level }eNB\text{ value; or}$$

$$eNB\text{ identifier}=\text{geographic area value}*100000+\text{geographic area-level }eNB\text{ value.}$$

20. The non-transitory computer-readable medium of claim 17, further comprising one or more instructions to:
generate tracking region values based on the tracking region value limit; and
generate tracking area values based on the tracking area value limit.

21. The non-transitory computer-readable medium of claim 20, wherein the instructions to calculate the tracking area codes further comprise one or more instructions to calculate the tracking area codes based on the following expression:
tracking area code=tracking region value+tracking area value, wherein the tracking area code is represented as a 16 bit value and the tracking region value is represented by a high byte and the tracking area value is represented by a low byte.

* * * * *